US006947367B2

United States Patent
Nakamura et al.

(10) Patent No.: US 6,947,367 B2
(45) Date of Patent: Sep. 20, 2005

(54) SINGLE MEANS FOR CONVERTING BEAM WIDTHS OF PLURAL LASER BEAMS WITH DIFFERENT ENTRY AND EXIT ANGLE WITH OFFSET

(75) Inventors: Shigeru Nakamura, Tachikawa (JP); Kouji Arikawa, Hitachinaka (JP); Kazuko Shigematsu, Yoshikawa (JP)

(73) Assignee: Hitachi, Ltd., Tokyo (JP)

( * ) Notice: Subject to any disclaimer, the term of this patent is extended or adjusted under 35 U.S.C. 154(b) by 363 days.

(21) Appl. No.: 09/796,747

(22) Filed: Mar. 2, 2001

(65) Prior Publication Data

US 2001/0024418 A1 Sep. 27, 2001

(30) Foreign Application Priority Data

May 24, 2000 (JP) ........................................ 2000-157964

(51) Int. Cl.⁷ ................................................. G11B 7/12
(52) U.S. Cl. ............................ 369/112.09; 369/112.28; 369/44.37
(58) Field of Search ..................... 369/112.09, 112.28, 369/44.37, 112.01, 112.03

(56) References Cited

U.S. PATENT DOCUMENTS

| 4,564,931 | A | * | 1/1986 | Ohara et al. ............... 369/110 |
| 5,204,523 | A | * | 4/1993 | Appel et al. ................ 250/236 |
| 5,212,698 | A | * | 5/1993 | Kafka et al. .................. 372/18 |
| 5,365,535 | A | | 11/1994 | Yamaguchi et al. |
| 5,701,210 | A | * | 12/1997 | Ohtaki ...................... 359/831 |
| 5,771,122 | A | * | 6/1998 | Shuman ..................... 359/487 |
| 6,034,939 | A | * | 3/2000 | Takasawa et al. ........... 369/112 |
| 6,396,622 | B1 | * | 5/2002 | Alden ....................... 359/315 |

FOREIGN PATENT DOCUMENTS

| JP | 10-261240 | 9/1998 |
| JP | 10-289468 | 10/1998 |

* cited by examiner

Primary Examiner—Gautam R. Patel
(74) Attorney, Agent, or Firm—McDermott Will & Emery LLP

(57) ABSTRACT

A low-profile optical disk device which performs recording and reproducing using a plurality of laser light sources with different wavelengths, without thug need for additional components. It is used as a DVD-Ram, CD-R or the like. It comprises a plurality of neighboring laser light sources with different wavelengths: a beam-shaping prism for expanding the width of laser beams in a direction in which the plural laser light sources are arranged; and a focus lens which forms an optical spot on an optical disk, where laser light sources with longer wavelengths are positioned closer to an extension line of a refracted beam created by the beam-shaping prism. The above arrangement enables correction of optical spot coma aberrations caused by a laser light source positioned out of the optical axis of the focus lens, thereby realizing a low-profile optical disk device with high optical performance.

7 Claims, 8 Drawing Sheets

SINGLE MEANS FOR CONVERTING BEAM WIDTHS OF PLURAL LASER BEAMS WITH DIFFERENT ENTRY AND EXIT ANGLE WITH OFFSET

BACKGROUND OF THE INVENTION

The present invention relates to an optical head and an optical disk using the same for recording or playing back information to and from an optical information medium such as an optical disk. More specifically, the present invention relates to an optical head and an optical disk using the same that can record information using a laser module in which multiple semiconductor laser chips having different wavelengths are mounted.

In optical information recording/playback devices such as optical disk devices, various features are desired in addition to a compact and thin design.

For example, there is a significant demand for using a single compact optical head that can record and playback both CD-R (Compact Disk-Recordable), which has seen widespread use as a writable optical disk medium, and DVD-RAM (Digital Versatile Disc/Digital Video Disc), which was developed recently as an optical disk medium allowing high-density recording. The wavelength of lasers used in recording and playback of CD-Rs is approximately 780 nm, while the wavelength of lasers used in recording and playback of DVDs is approximately 660 nm. Thus, there is a need to mount both a laser light source with a 780 nm wavelength and a laser light source with a 660 nm wavelength on a single optical head.

For example, Japanese laid-open patent publication number Hei 10-261240 and Japanese laid-open patent publication number Hei 10-289468 propose a compact optical head which integrates into a single unit a semiconductor laser chip with a wavelength of approximately 780 nm for CDs, a semiconductor laser chip with a wavelength of approximately 660 nm-for DVDs, and an optical detector element.

Laser beams emitted from light-emitting points at different positions generally pass through different positions of a lens system at different angles. In these optical heads, the laser beams emitted from the two semiconductor laser chips enter a focus lens at different positions and different angles. In the embodiments described in Japanese laid-open patent publication number Hei 10-261240 and Japanese laid-open patent publication number Hei 10-289468, a semiconductor laser chip with a 660 nm wavelength for DVDs is disposed on the optical axis of a lens system formed by a focus lens and a collimating lens. A semiconductor laser chip with a 780 nm wavelength for CDs is disposed away from the optical axis of the lens system. Since the laser beam for DVDs enters the focus lens directly from above, the DVD laser spotlight does not tend to generate aberration. On the other hand, the laser beam for CDs enters the focus lens at an angle, and therefore tends to generate aberration (especially coma aberration) in the laser spotlight for CDs.

In Japanese laid-open patent publication number Hei 10-261240, a holographic optical element is used. In Japanese laid-open patent publication number Hei 10-289468, an optical means using polarizing prism (a birefringent plate) or holograms allows just the optical path of the laser beam for CDs to be bent so that it enters straight into the focus lens.

To record information, there is also the need for beam-shaping means to take a laser beam with anisotropic optical intensity distribution emitted by a semiconductor laser and efficiently focus it to an optical spot that has an isotropic optical intensity distribution.

Furthermore, there is a great demand for compact design in optical heads. Although not described in the embodiments in Japanese laid-open patent publication number Hei 10-261240 and Japanese laid-open patent publication number Hei 10-289468, this generally requires optical components other than the focus lens to be arranged on a plane parallel to the disk surface and an upward projecting mirror to guide the beam to the focus lens.

SUMMARY OF THE INVENTION

However, in the conventional technologies described above, it is necessary to provide special holographic optical elements, polarizing prisms (birefringent plate), and the like that can bend the optical path of the laser beam with a wavelength of 780 nm for CDs only while not affecting the laser beam with a wavelength of 660 nm for DVDs. This increases optical component costs in the optical head.

The object of the present invention is to provide an optical head and optical disk device using the same for recording information or playing back information to or from an optical information medium using multiple laser light sources wherein: aberration of the laser beam from semiconductor lasers positioned outside the optical axis are prevented without using new, expensive optical components; information can be recorded; and a thin design can be provided.

In order to achieve this object, a first invention provides an optical head including: laser light sources emitting a plurality of laser beams with different wavelengths; means for converting beam width having dispersion characteristics so that the plurality of laser beams emitted from the laser light sources exit at different angles when the plurality of laser beams enter at identical angles, and converting beam widths of the plurality of laser beams; and means for optically focusing the plurality of laser beams exiting from beam width converting means to an optical spot on an optical information medium. The laser light sources corresponding to the laser beams are positioned in the vicinity of a path of a laser beam projected from an entrance side of the beam width converting means when the plurality of laser beams are entered into an exit side of the beam width converting means.

In the first invention, the laser light sources can be positioned so that the plurality of laser beams emitted from the plurality of laser light sources enter optical focussing means within an entry angle tolerance range. Beam width converting means can be a refraction-type beam width converting means converting beam widths through refraction.

A second invention provides an optical head including: laser light sources emitting a plurality of laser beams with different wavelengths; means for converting beam width converting beam widths of the plurality of laser beams; and means for optically focusing the plurality of laser beams exiting from beam width converting means to an optical spot on an optical information medium. Beam width converting means has dispersion characteristics so that the plurality of laser beams emitted from the laser light sources exit at different angles when the plurality of laser beams enter at identical angles. The laser light sources are arranged in a sequence determined by wavelength in order to reduce shifting in exit angles caused by the dispersion characteristics when the laser beams emitted from the plurality of laser light sources exit from beam width converting means.

In the second invention, beam width converting means can be a refraction-type beam width converting means converting beam widths through refraction. The plurality of laser light sources can be arranged so that the laser light sources with longer wavelengths are positioned closer to an extension line of a refracted beam created by the refraction of beam width converting means. The refraction-type beamwidth converting means can be a prism.

In a third invention, an optical head includes: a plurality of semiconductor laser chips having different wavelengths; a collimating lens forming parallel beams from a plurality of laser beams emitted from the semiconductor laser chips; means for optically focusing the plurality of laser beams on the optical information medium as an optical spot; and a beam-shaping prism expanding a width of the laser beams in a direction in which the semiconductor laser chips are arranged. The semiconductor laser chips with longer wavelengths are positioned closer to an extension line of a beam exiting from the beam-shaping prism.

In the third invention, the beam-shaping prism can include a reflective surface, and semiconductor laser chips with longer wavelengths can be positioned toward a reflective side of said beam-shaping prism. Also, the beam-shaping prism can be positioned below optical focusing means.

A fourth invention provide an optical disk device in which a laser beam from an optical head is projected on an optical information medium. A laser beam reflected from the optical information medium is projected onto a plurality of optical detector elements. A signal electronically converted by the plurality of optical detector elements is used to provide a control signal and an information playback signal. The optical disk device includes an optical head as described.

DESCRIPTION OF THE PREFERRED EMBODIMENTS

An optical head and an optical disk device using the same will be described, with references to the drawings.

Figure 1:
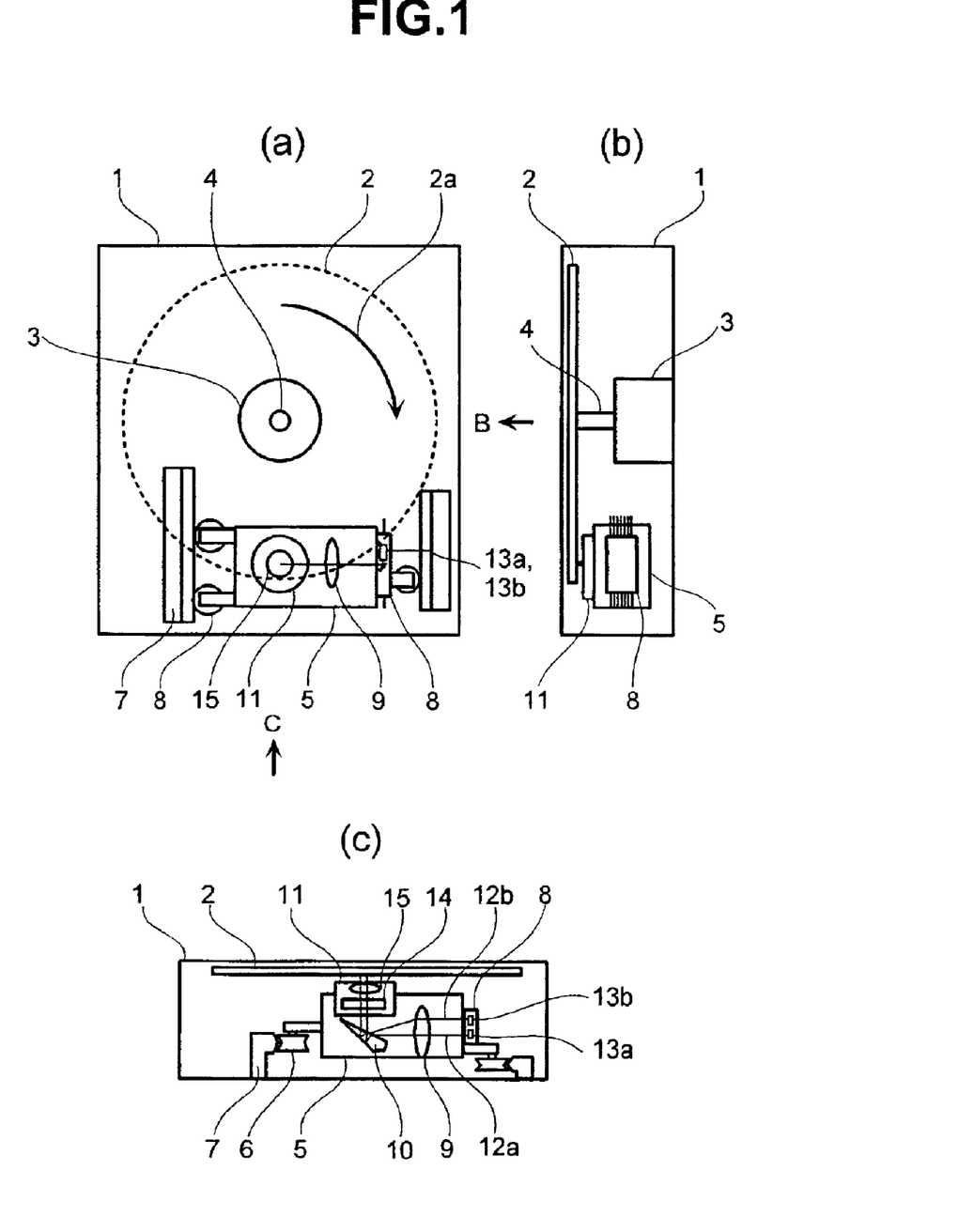
FIGS. 1a–c are a top-view drawing of an embodiment of an optical disk device according to the present invention, a side-view drawing as seen from arrow B, and a side-view drawing as seen from arrow C.

FIG. 1 shows an architecture of an embodiment of an optical disk device according to the present invention. FIG. 1(a) is a top-view drawing. FIG. 1(b) is a side-view drawing of FIG. 1(a) as seen from the direction indicated by the arrow B. FIG. 1(c) is a side-view drawing of FIG. 1(a) as seen from the direction indicated by the arrow C. In FIG. 1(a)–FIG. 1(c), elements assigned the same numbers represent identical elements. The figures show an optical disk 2, representing a CD-ROM disk or CD-R disk having a substrate thickness of 1.2 mm and using a laser wavelength of 780 nm for recording and playback. Alternatively, the optical disk 2 can be a DVD disk having a substrate thickness of 0.6 mm and using a laser wavelength of 660 nm for recording and playback. A motor 3 is secured to an optical disk device 1 and rotates the optical disk 2 using a rotation shaft 4. An optical head 5 can be moved along the radial direction of the optical disk 2 over a rail 7 by an access mechanism 6, formed from a voice coil motor, pulley, and the like. The optical head 5 is equipped internally with a two-laser module 8, a collimating lens 9, a beam-shaping upward prism 10, and a lens actuator 11. The two-laser module 8 is equipped with a semiconductor laser chip 13a projecting a 660 nm laser beam 12a and a semiconductor laser chip 13b projecting a 780 nm wavelength laser beam 12b. A focus lens 15 and a compound element 14 formed from a quarter-wave plate and a polarized diffraction grating are attached to the lens actuator 11.

Next, the structure of a laser module according to the present invention will be described using FIG. 2.

Figure 2:
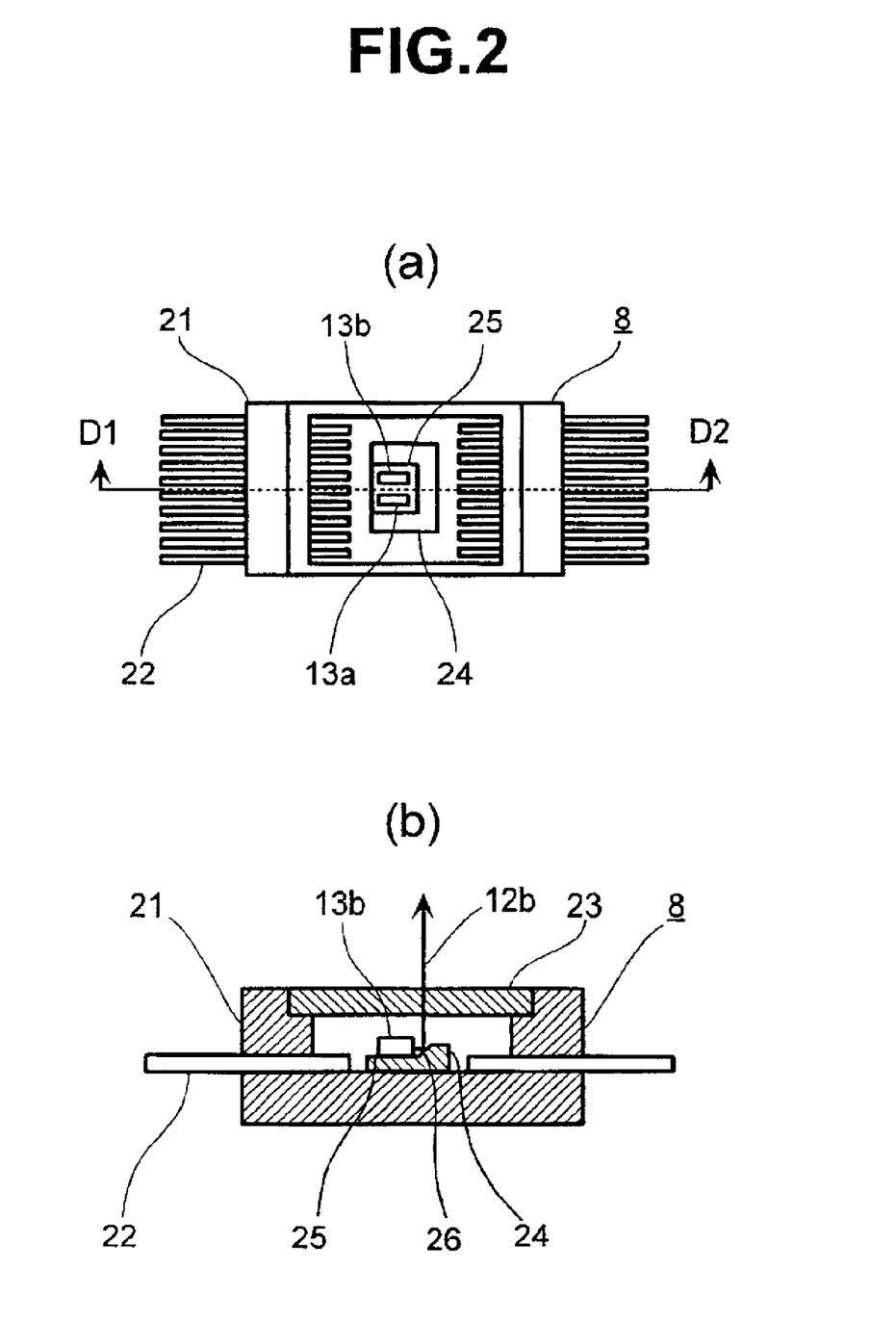
FIGS. 2a–b are a front-view drawing of an embodiment of a laser module according to the present invention and a cross-section drawing along the D1–D2 line.

FIG. 2 shows an architecture of an embodiment of a laser module according to the present invention. FIG. 2(a) is a front-view drawing. FIG. 2(b) is a cross-section along the D1–D2 line in FIG. 2(a). In the figures, a package 21 is molded from a material having good thermal conduction such as aluminum nitride. Multiple lead wires 22 are passed through the package 21 to transfer electronic signals. A semiconductor substrate 24 formed from silicon or the like is disposed inside the package 21 and is sealed by the package 21 and a light-transmissive glass plate 23. An indentation 25 is formed on the semiconductor substrate 24 through etching or the like, and a sloped surface of the indentation 25 forms a mirror surface 26 at a 45-degree angle. The semiconductor laser chip 13a and the semiconductor laser chip 13b are mounted in the indentation 25 and the laser beams 12a, 12b are emitted to the right in FIG. 2(b), i.e., in the direction of the mirrored surface 26. The laser beams 12a, 12b are reflected by the mirrored surface 26 and pass through the glass plate 23 and are projected out from the two-laser module 8. The active layers of the semiconductor laser chip 13a and the semiconductor laser chip 13b, i.e., the layers emitting the laser beams, are oriented roughly parallel to the flat surface of the indentation 25. Thus, when viewed from a position facing FIG. 2(a), i.e., from the direction opposite to the direction in which the laser beams 12a, 12b are emitted in FIG. 2(b), the optical intensity distribution of the laser beams 12a, 12b forms a roughly elliptical shape narrow along the vertical axis and wide along the horizontal axis of FIG. 2(a). The laser beams 12a, 12b shown in FIG. 2(b) represent the beams before they enter the collimating lens 9.

In FIG. 1(c), the laser beams 12a, 12b exiting from the two-laser module 8 are formed into parallel rays by the collimating lens 9 and are sent into the beam shaping upward prism 10. The optical intensity distribution of the laser beams 12a, 12b before they enter the beam shaping upward prism 10 is narrow along the vertical axis of the plane of the page of FIG. 1(c) and wide along the axis perpendicular to the plane of the page of FIG. 1(c). The beam shaping upward prism 10 is used to make the beam width of the laser beams 12a, 12b wider along the vertical axis of the plane of the page, providing a more uniform optical intensity distribution. In other words, the laser beams 12a, 12b, which are shaped narrow along the vertical axis of the plane of the page of FIG. 1(c) and wide along the axis perpendicular to the plane of the page of FIG. 1(c) before they enter the beam shaping upward prism 10, pass through the beam shaping upward prism 10. The vertical length of the laser beams 12a, 12b varies according to the angle of the entry surface of the beam shaping upward prism 10 relative to the laser beams 12a, 12b. Thus, by setting up the angle of the entry surface of the beam shaping upward prism 10, the laser beams 12a, 12b can be provided with isotropic intensity distribution. The laser beams 12a, 12b, which now have isotropic intensity distribution, are reflected by the beam shaping upward prism 10 and enter the compound element 14 and the focus lens 15 of the lens actuator 11.

Next, the lens actuator will be described using FIG. 3.

Figure 3:
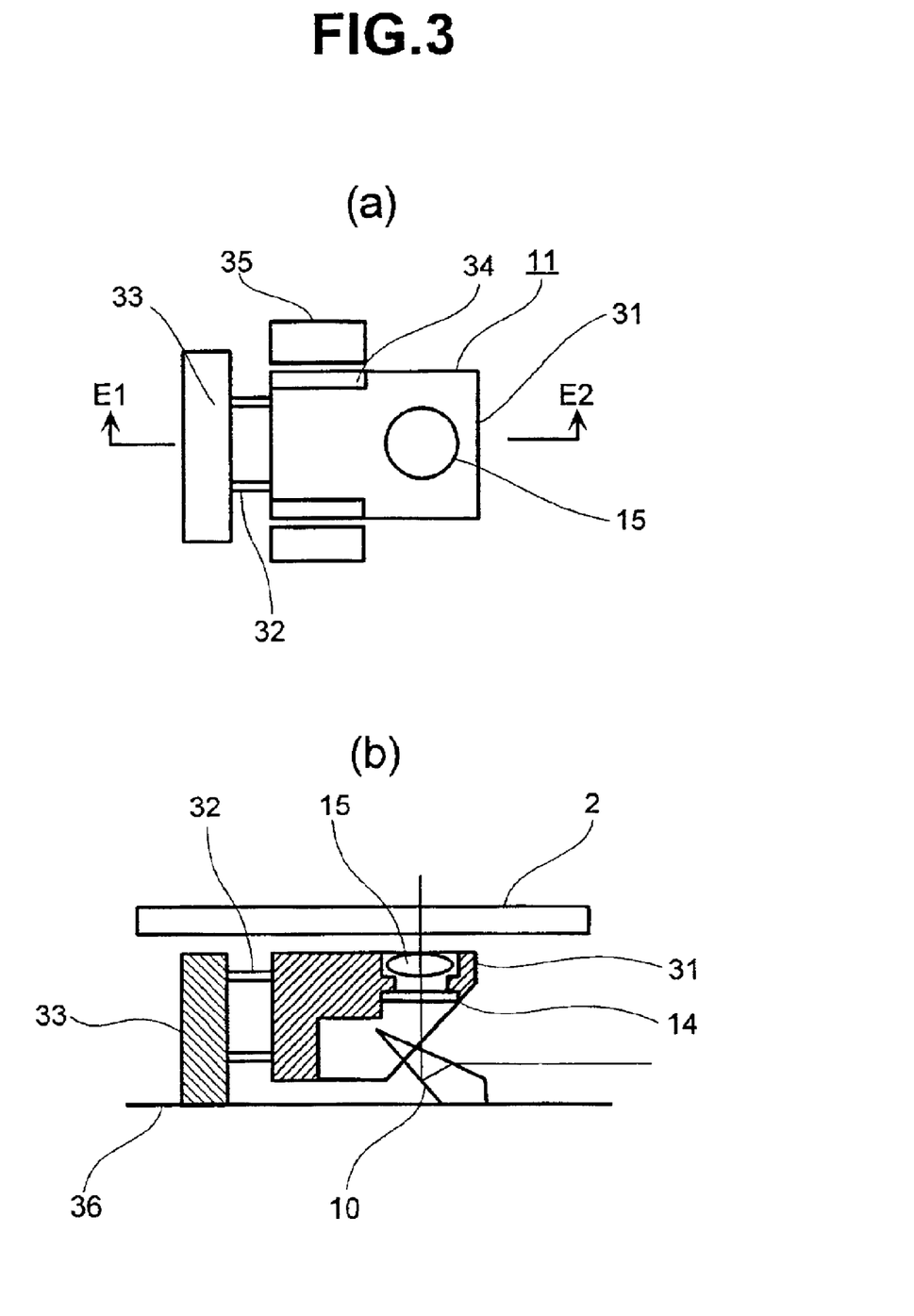
FIGS. 3a–b are a top-view drawing showing an example of a lens actuator used in this embodiment and a partial cross-section drawing along the E1–E2 line.

FIG. 3 is a drawing showing the architecture of a sample lens actuator used in this embodiment. FIG. 3(a) is a top-view drawing of the lens actuator as seen from the direction of the optical disk. FIG. 3(b) is a partial cross-section drawing along the E1–E2 line from FIG. 3(a). In FIG. 3(b), the optical disk 2 is drawn in for reference. The figures show a coil 34, the focus lens 15, and the compound element 14 below it. These are attached to a lens holder 31, which is supported by a support base 33 using a spring 32. The solid line 36 in FIG. 3(b) shows the surface of a case for the optical head 5, to which a magnet 35, the support base 33, and the like are secured. The lens actuator 11 provides focus control by driving the compound element 14 and the focus lens 15 vertically along the plane of the page in FIG. 3(b) and also provides tracking control by driving the compound element 14 and the focus lens 15 vertically along the plane of the page in FIG. 3(a) (along the radius of the optical disk 2).

In this embodiment, when the laser beams 12a, 12b from the semiconductor laser chips 13a, 13b enter the compound element 14, formed from a polarizing four-part diffraction grating and quarter-wave plate, the beams enter as ordinary rays. In this case, the laser beams 12a, 12b are passed through the polarizing diffraction grating without being diffracted and are formed into circular light by the quarter-wave plate in the compound element 14. The laser beams 12a, 12b reflected by the optical disk 2 pass through the quarter-wave plate of the compound element 17 again to form extraordinary rays, which are then diffracted by the polarizing four-part diffraction grating.

Figure 4:
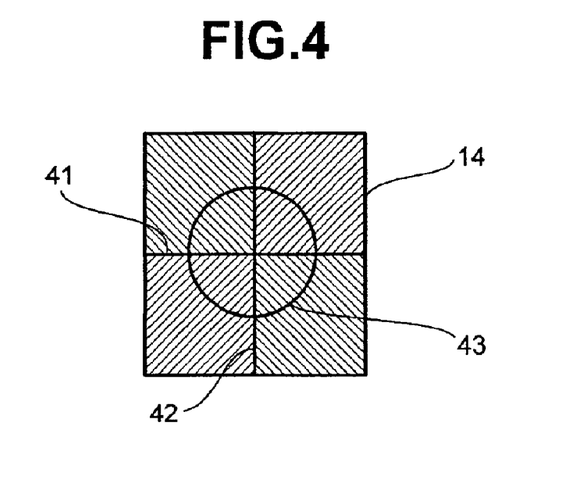
FIG. 4 is a plan drawing showing an example of a diffraction grating pattern of a four-part diffraction grating of a compound element.

The following is a description of the four-part diffraction grating.

FIG. 4 shows a plan drawing of a sample diffraction grating pattern of the four-part diffraction grating in the compound element. As the figure shows, a four-part diffraction grating 40 is divided into four regions by boundary lines 41, 42. A circle 43 indicates the laser beam 12a or the laser beam 12b. The beam is separated by the four-part diffraction grating 40 into four +1 spectral order beams and four −1 spectral order beams. The four regions in the diffraction grating have grating grooves formed in different directions, but the grooves are equally spaced. Thus, the eight +/−1 spectral order beams have different diffraction orientations but the absolute values of the diffraction angles are identical. These eight diffraction beams are focused by the collimating lens 9 into eight spotlights on the surface of the semiconductor substrate 24 in the laser module 8 containing the semiconductor laser chips 13a, 13b.

Figure 5:
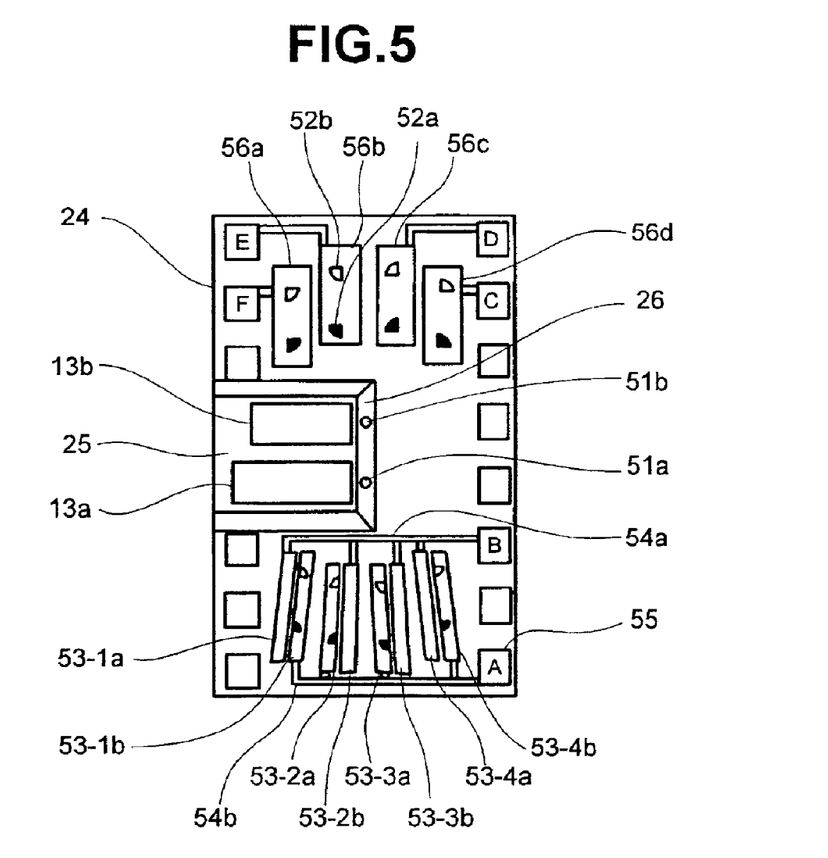
FIG. 5 is a front-view drawing of an embodiment of a semiconductor substrate in the laser module from FIG. 2.

The following is a detailed description of an embodiment of the semiconductor substrate 24 in the laser module, using FIG. 5.

FIG. 5 is a front-view drawing of an embodiment of the semiconductor substrate in the laser module shown in FIG. 2. The semiconductor laser chip 13a and the semiconductor laser chip 13b are mounted in the indentation 25 formed on the semiconductor substrate 24. The semiconductor laser chip 13a beams the laser beam 12a to the right in the figure.

The laser beam 12a is reflected at a position 51a of the mirrored surface 26 and exits the surface of the page perpendicularly. Similarly, the semiconductor laser chip 13b beams the laser beam 12b to the right in the figure. The laser beam 12b is reflected at a position 51b of the mirrored surface 26 and exits the surface of the page perpendicularly.

In the figure, the eight shaded quarter-circles indicate the spotlights 52a of the laser beam 12a reflected by the optical disk 2 and separated by the four-part diffraction grating 40. The spotlights 52a lie on the perimeter of a circle having its center at the position 51a. The eight white (unshaded) quarter-circles indicate spotlights 52b of the laser beam 12b reflected by the optical disk 2 and separated by the four-part diffraction grating 40. The spotlights 52b lie on the perimeter of a circle having its center at the position 51b.

Optical detection elements 53-1a, 53-1b, 53-2a, 53-2b, 53-3a, 53-3b, 53-4a, 53-4b are long, thin optical detection elements arranged in pairs of facing elements that provide focus offset detection signals. The optical detection elements 53-1a, 53-1b, the optical detection elements 53-2a, 53-2b, the optical detection elements 53-3a, 53-3b, and the optical detection elements 53-4a, 53-4b form pairs. These four pairs receive the light from the four spotlights 52a or the four spotlights 52b. Focus offset detection is performed with a knife-edge method (Foucault method) using the four-region beam. A focus detection signal could be provided by taking the differences of the output signals from the pairs of optical detection elements 53-1a, 53-1b, 53-2a, 53-2b, 53-3a, 53-3b, 53-4a, 53-4b to provide a focus offset detection signal. However, in this embodiment, the light-receiving elements are connected as shown in the figure by conductive films 54a, 54b formed from aluminum or the like. The difference between the output signals from an A terminal and a B terminal of a wire-bonding pad 55 is calculated to obtain a focus offset detection signal. Optical detection elements 56a, 56b, 56c, 56d, which are used to provide a track offset detection signal and an information playback signal, are connected to a C terminal, a D terminal, an E terminal, and an F terminal of the pad 55.

Figure 6:
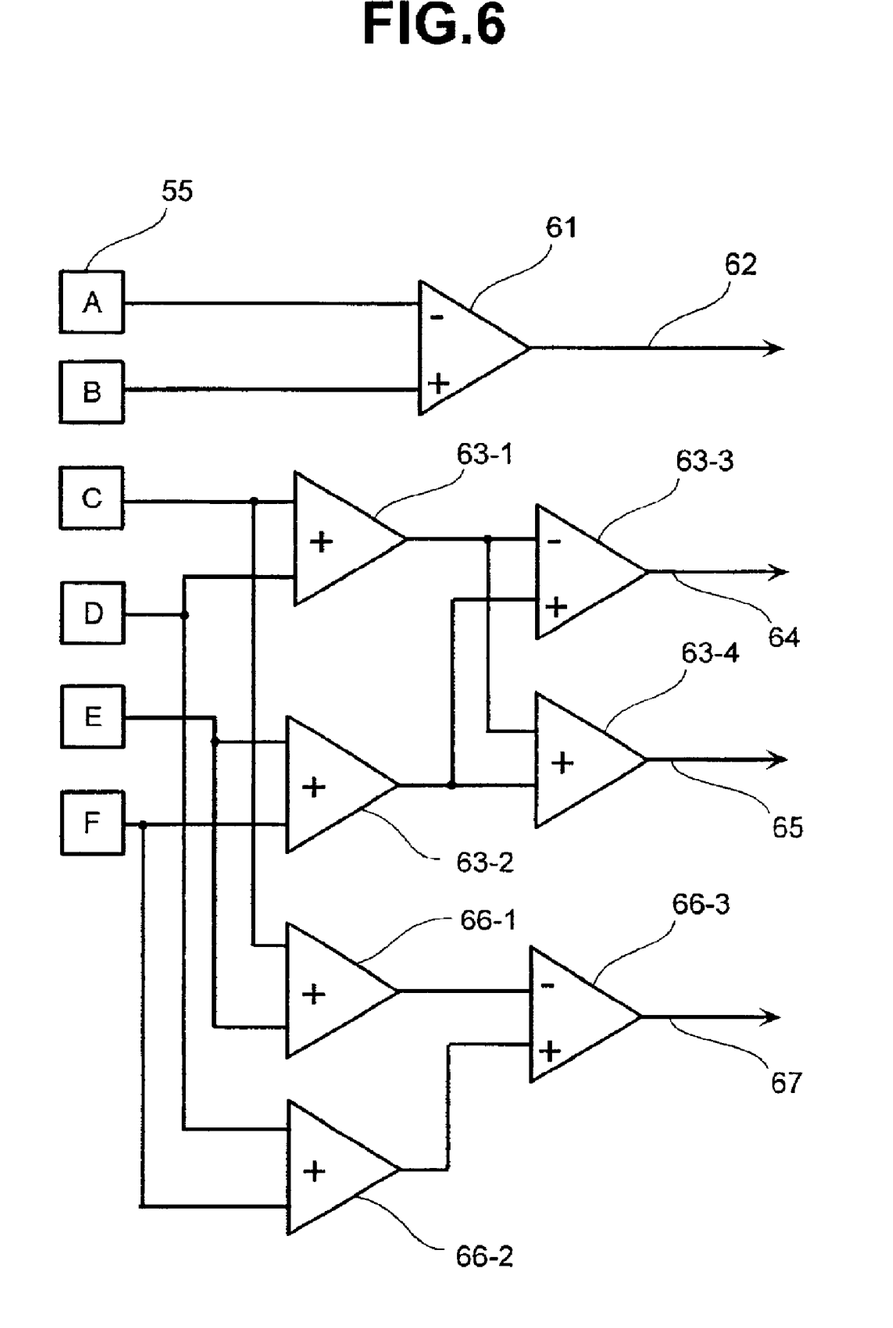
FIG. 6 is a block diagram showing an embodiment of a signal arithmetic circuit for obtaining a focus offset detection signal, a track offset detection signal, and an information playback signal.

The signals output from the terminals A–F of the pad 55 are sent to the block shown in FIG. 6 to provide the necessary signals.

FIG. 6 is a block diagram of an embodiment of a signal arithmetic circuit providing a focus offset detection signal, a track offset detection signal, and an information playback signal. In the figure, a differential circuit 61 calculates the difference between the output signals from the A terminal and the B terminal of the wire-bonding pad 55 shown in FIG. 5. The differential circuit 61 outputs a focus offset detection signal 62. An adder 63-1 adds the output signals from the C terminal and the D terminal, and an adder 63-2 adds the output signals from the E terminal and the F terminal. A differential circuit 63-3 takes the difference between the output signal from the adder 63-1 and the output signal from the adder circuit 63-2 and outputs a push-pull track offset detection signal 64 for cases when an optical disk having guide grooves or the like is used. An adder 63-4 adds the output signal from the adder 63-1 and the output signal from the adder 63-2 and outputs an information playback signal 65. An adder 66-1 adds the output signals from the C terminal and the E terminal. An adder 66-2 adds the output signals from the D terminal and the F terminal. A differential circuit 66-3 takes the difference between the output signal from the adder 66-1 and the output signal from the adder 66-2. An output signal 67 thereof is used to provide a phase-difference track offset detection signal for optical disks that use guide pits or the like. The focus offset detection signal and the track offset detection signal are sent to a coil 34 of a lens actuator 11 shown in FIG. 3 to drive the focus lens 15 attached to the lens actuator in the direction of the optical axis as well as along the disk radius, thus providing automatic focus control and tracking. As a result, the optical intensity of the laser beam 12a or the laser beam 12b from the semiconductor laser chip 13a or the semiconductor laser chip 13b can be modulated by an information recording signal to allow information to be recorded to the optical disk 2. Also, by keeping a constant optical intensity for the laser beam 12a or the laser beam 12b from the semiconductor laser chip 13a or the semiconductor laser chip 13b, information recorded on the optical disk 2 can be played back using the information playback signal 65.

Figure 7:
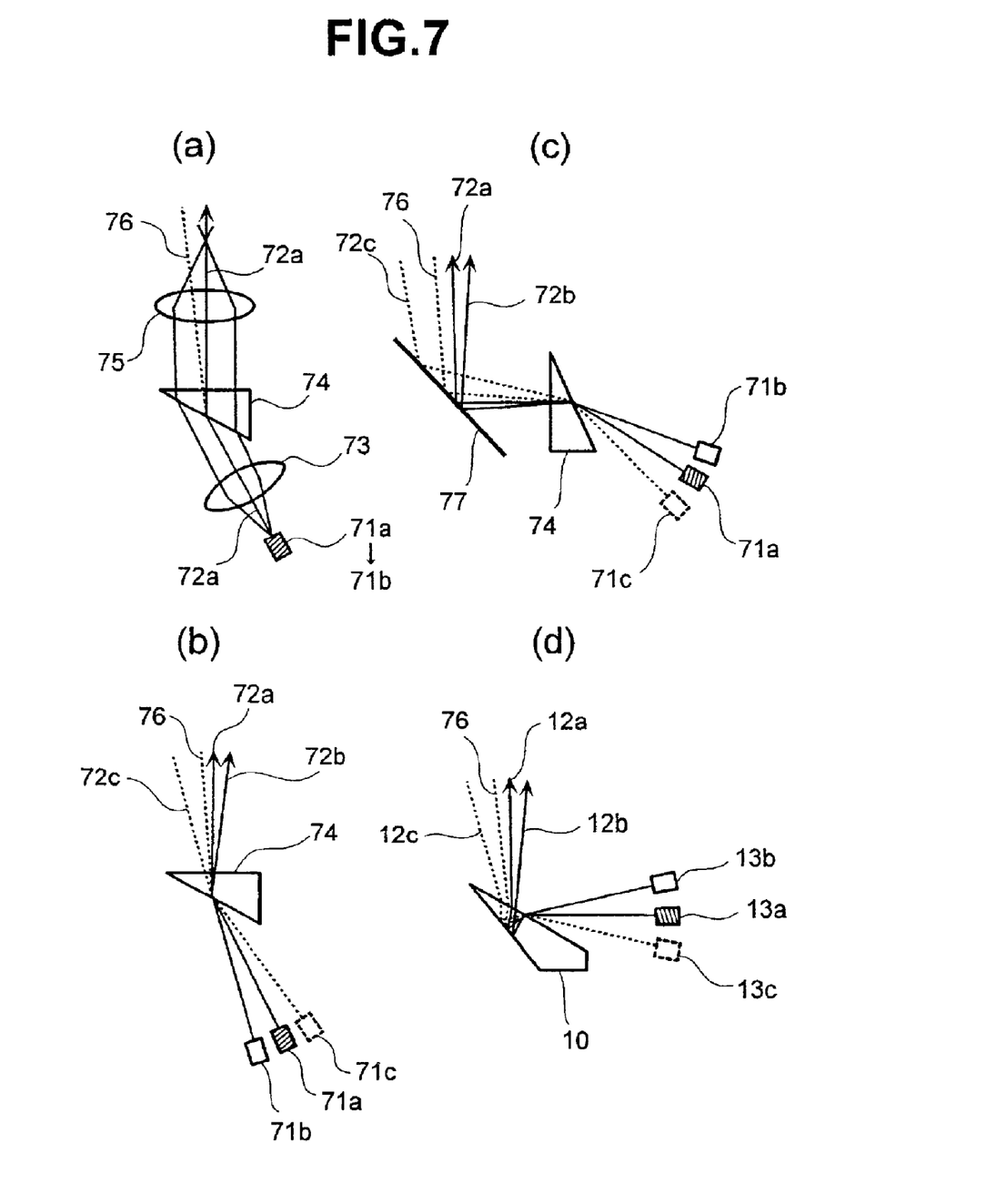
FIGS. 7a–d are perspective drawings of an optical system for the purpose of describing principles behind an optical head according to the present invention.

The following is a description of the principles behind the optical head of the present invention, with references to FIG. 7.

FIG. 7 shows perspective drawings of optical systems for the purpose of describing examples of optical head principles in the present invention. FIG. 7(a) shows an optical system of an optical head having a beam-shaping prism. A semiconductor laser chip 71a beams a laser beam 72a with a wavelength of, for example, approximately 660 nm. The laser beam 72a is made to form parallel rays by a collimating lens 73 and is refracted by the beam-shaping prism 74, causing the beam width to be wider along the axis going into the plane of the page. This beam then enters a focus lens 75. If the semiconductor laser chip 71a is replaced at the same position with a semiconductor laser chip 71b having a wavelength of approximately 780 nm, the laser beam with a wavelength of approximately 780 nm will exit at an offset from the beam-shaping prism 74, as indicated by a dotted line 76, and the beam will enter the focus lens 75 diagonally. This happens because the refraction index will decrease for longer wavelengths in standard optical materials.

In FIG. 7(b), the collimating lens 73 and the focus lens 75 from FIG. 7(a) are omitted for convenience. The laser beam 72a is the beam with the wavelength of approximately 660 nm from the semiconductor laser chip 71a. The dotted line 76 shows the exit direction of the laser beam when the semiconductor chip 71b with a wavelength of approximately 780 nm is put in the place of the semiconductor laser chip 71a. When the semiconductor laser chip 71b with a wavelength of approximately 780 nm is put in the place of the semiconductor laser chip 71a with a wavelength of approximately 660 nm, the dispersion characteristics of the beam-shaping prism 74 cause the exit angle of the laser beam with the wavelength of approximately 780 nm to be offset as indicated by the dotted line 76. As shown in the figure, the semiconductor laser chip 71b is rotated to the right (clockwise) from the position of the semiconductor laser chip 71a or is shifted to a position close to a line extending from the exit beam 72a of the beam-shaping prism 74. With this arrangement, the laser beam 72b with the wavelength of approximately 780 nm is shifted so that the offset caused by the dispersion characteristics of the beam-shaping prism 74 is canceled out, and the offset in the entry angle to the focus lens is reduced. Conversely, if the semiconductor laser chip with the wavelength of approximately 780 nm is placed at the position indicated by the dotted line 71c, the laser beam will be offset as shown in the dotted line 72c in a direction where the exit angle offset caused by the dispersion characteristics of the beam-shaping prism 74 is increased, and the offset in the entry angle to the focus lens is increased.

Based on the above, it is possible to make both laser beams have roughly the same exit angles from the beam-shaping prism 74 by shifting the semiconductor laser chip 71b having the wavelength of approximately 780 nm appropriately from the semiconductor laser chip 71a having the wavelength of approximately 660 nm.

FIG. 7(c) shows an optical system of an optical head equipped with the beam-shaping prism 74. As in FIG. 7(b), the collimating lens 73 and the focus lens 75 are omitted to simplify the discussion. The laser beam 72a is the beam with the wavelength of approximately 660 nm from the semiconductor laser chip 71a. The dotted line 76 shows the exit direction of the laser beam when the semiconductor chip 71b with a wavelength of approximately 780 nm is put in the place of the semiconductor laser chip 71a. When the semiconductor laser chip 71b is shifted to a position closer to a line extending from the exit beam 72a from the beam-shaping prism 74 than the position of the semiconductor laser chip 71a, i.e., its position is rotated counterclockwise to the position 71b in FIG. 7(c), the laser beam 72b with the wavelength of approximately 780 nm is shifted in a direction that cancels out the exit angle offset generated by the dispersion characteristics of the beam-shaping prism 74. As a result, the shift in the entry angle to the focus lens can be reduced. Conversely, placing the semiconductor laser chip with the wavelength of approximately 780 nm at the position indicated by the dotted line 71c causes the shift in exit angle of the laser beam to increase due to the dispersion characteristics of the beam-shaping prism 74, and the shift in the entry angle to the focus lens increases.

FIG. 7(d) shows an optical system of an optical system equipped with the same beam-shaping upward prism 10 as in the embodiment from FIG. 1. The collimating lens 9 and the focus lens 15 from FIG. 1 are not shown in this figure. As with FIG. 7(c), the laser beam 72a is the beam with the wavelength of approximately 660 nm from the semiconductor laser chip 71a. The dotted line 76 shows the exit direction of the laser beam when the semiconductor chip 71b with a wavelength of approximately 780 nm is put in the place of the semiconductor laser chip 71a. When the semiconductor laser chip 13b is disposed at a position closer to the extension line of the refracted beam refracted inside the beam-shaping upward prism 10 compared to the semiconductor laser chip 13a, i.e., at the position 13b in the figure, the laser beam 12b with the wavelength of approximately 780 nm is shifted in a direction that cancels the exit angle offset generated by the dispersion characteristics of the beam-shaping upward prism 10, and the offset in the entry angle to the focus lens can be reduced. Conversely, if the semiconductor laser chip with the wavelength of approximately 780 nm is positioned at dotted line 13c, the laser beam will travel as shown in dotted line 12c. The offset in the exit angle generated by the dispersion characteristics of the beam-shaping upward prism 10 will be increased and the offset of the entry angle to the focus lens will be increased.

As described above, the position of semiconductor laser chips having different wavelengths can be set up as appropriate so that the entry angles to the focus lens 75 are roughly identical.

Also, the above points show that the semiconductor laser chips with different wavelengths should be placed at positions near the exit beam positions when the beams from the semiconductor laser chips travel from the exit side of the beam-shaping prism 74 or the beam-shaping upward prism 10 to the collimating lens 73, i.e., when the laser beams are projected in reverse.

By arranging the semiconductor laser chips with different wavelengths in this manner, the laser beams from the semiconductor laser chips can be beamed to the focus lens within an entry angle tolerance range. The entry angle tolerance range of the focus lens will vary according to focus lens, so the semiconductor laser chips will have to be positioned so that they fall within the tolerance range of the focus lens used.

Figure 8:
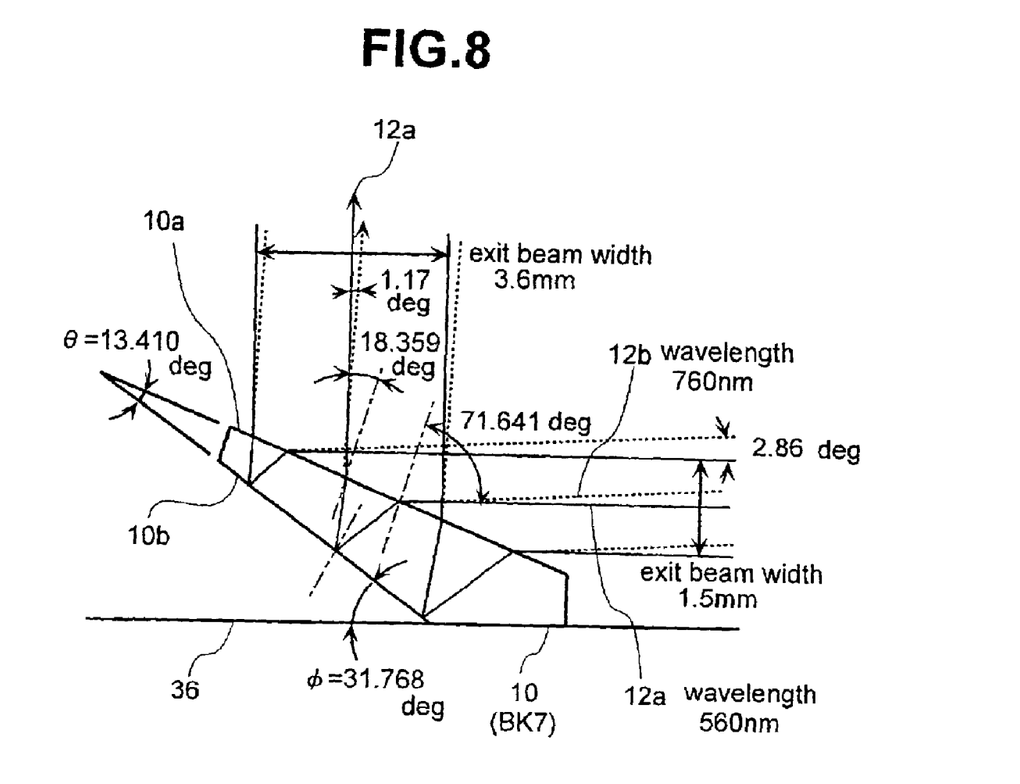

The following is a description of a specific shape of the beam-shaping upward prism 10 used in this embodiment, with references to FIG. 8.

FIG. 8 is a plan drawing showing the structure of a beam-shaping upward prism of an optical head according to the present invention. The material of the beam-shaping upward prism 10 shown in the figure is a standard vitreous material referred to as "BK7". The vertex angle θ formed between an entry/exit surface 10a and a reflection surface 10b is 13.410 degrees. The angle φ formed between the reflection surface 10b and a surface 36 of the optical head case is 31.768 degrees. The laser beam 12a with 660 nm wavelength from the semiconductor laser chip 13a enters the entry surface 10a of the beam-shaping upward prism 10 from a horizontal direction parallel to the case surface 36. Then, the laser beam 12a enters the beam-shaping upward prism 10 at an angle of 71.641 degrees relative to the normal to the entry/exit surface 10a, and is refracted and travels downward. It is then reflected by the reflection surface 10b and travels upward and exits the beam-shaping upward prism 10 at an angle of 18.359 degrees relative to the normal of the entry surface 10a. Thus, the direction of the laser beam 12a is perpendicular to the optical head case surface 36. At the same time, the width of the laser beam, which is 1.5 mm when it enters the entry surface 10a, is increased by a factor of approximately 2.4, to 3.6 mm, after it exits. If a laser beam with a wavelength of 780 nm is projected horizontally and parallel to the case surface 36, the path of the imaginary laser beam corresponding to the dotted line 76 from FIG. 7 would be titled 0.106 degrees to the left of the page from the exit angle of the laser beam 12a due to dispersion.

If the semiconductor laser chip 13a and the semiconductor laser chip 13b disposed on the semiconductor substrate 24 in the two-laser module 8 shown in FIG. 5 are disposed so that the light-emitting points are separated by 350 microns, the focal distance of the collimating lens 9 shown in FIG. 1(c) is 7 mm, and the semiconductor laser chip 13b is positioned above the semiconductor laser chip 13b as shown in FIG. 7(d), then the laser beam 12b from the semiconductor laser chip 13b, having a 780 nm wavelength, enters the beam-shaping upward prism 10 from approximately 2.86 degrees above the horizontal direction parallel to the surface 36, as shown by the dotted line in FIG. 8. The laser beam 12b will be offset by 1.17 degrees to the right in the figure from the exit angle of the laser beam 12a. Conversely, if the semiconductor laser chip 13b is positioned downward from the semiconductor laser chip 13a, the laser beam with wavelength 780 nm will enter the beam-shaping upward prism 10 at an angle of 2.86 degrees below the horizontal direction parallel to the surface 36, and the exit angle will be offset by 1.22 degrees to the left from the exit angle of the laser beam 12a (not shown in the figure).

Thus, as shown in FIG. 7(d), positioning the semiconductor laser chip 13b above the semiconductor laser chip 13a will reduce the offset in the exit angles between the laser beam 12a and the laser beam 12b.

In the embodiment described above, the laser light source is formed by arranging multiple semiconductor laser chips in a row or packaging semiconductor laser chips in the same manner. However, it would also be possible to have multiple laser oscillator regions with different wavelengths disposed on a single semiconductor laser chip as shown in FIG. 9.

Figure 9:
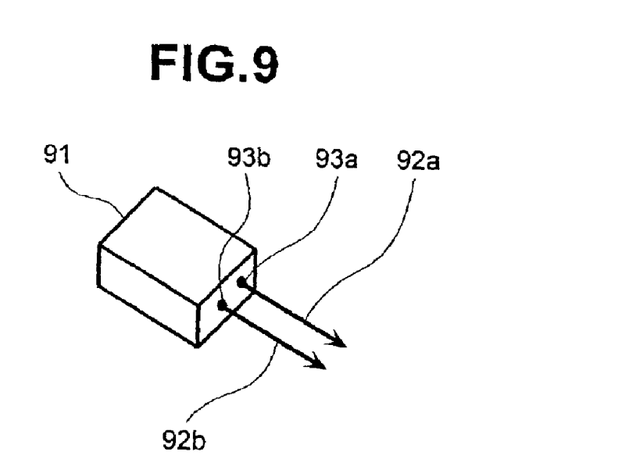
FIG. 9 is a perspective drawing showing another embodiment of a semiconductor laser chip.

FIG. 9 is a perspective drawing showing another embodiment of a semiconductor laser chip. In the figure, a laser chip 91 is formed with a semiconductor process to have two laser oscillator regions. The laser oscillator regions project a laser beam 92a with a short wavelength and a laser beam 92b with a long wavelength. The two-laser chip 91 can be used in place of the two semiconductor laser chips 13a, 13b shown in FIG. 5. For example, the laser beam 92a can have a wavelength of 660 nm, the laser beam 92b can have a wavelength of 780 nm, the interval between the light-emitting points 93a, 93b can be 100 microns, and the light-emitting point 93b can be positioned above the light-emitting point 93a, i.e., the laser beam 93a with the 660 nm wavelength is projected parallel to the case surface 36. In this case, the laser beam 92b with the 780 nm wavelength projected from the light-emitting point 93b enters the beam-shaping upward prism 10 from an angle of approximately 0.818 degrees above the horizontal direction parallel to the surface 36, as shown in the dotted line 12b in FIG. 8. The laser beam 92b exiting from the beam-shaping upward prism 10 will be tilted at an angle of 0.242 degrees to the right from the direction perpendicular to the surface 36.

Conversely, if the two-laser chip 91 is formed so that the light-emitting point 93b is positioned below the light-emitting point 93a, the laser beam 92b projected from the beam-shaping upward prism 10 will be offset by 0.440 degrees to the left from the direction perpendicular to the surface 36.

Thus, even with the two-laser chip 91, the exit angle offset between the laser beam 92a and the laser beam 92b will be smaller if the light-emitting point 93b is positioned above the light-emitting point 93a.

Figure 10:
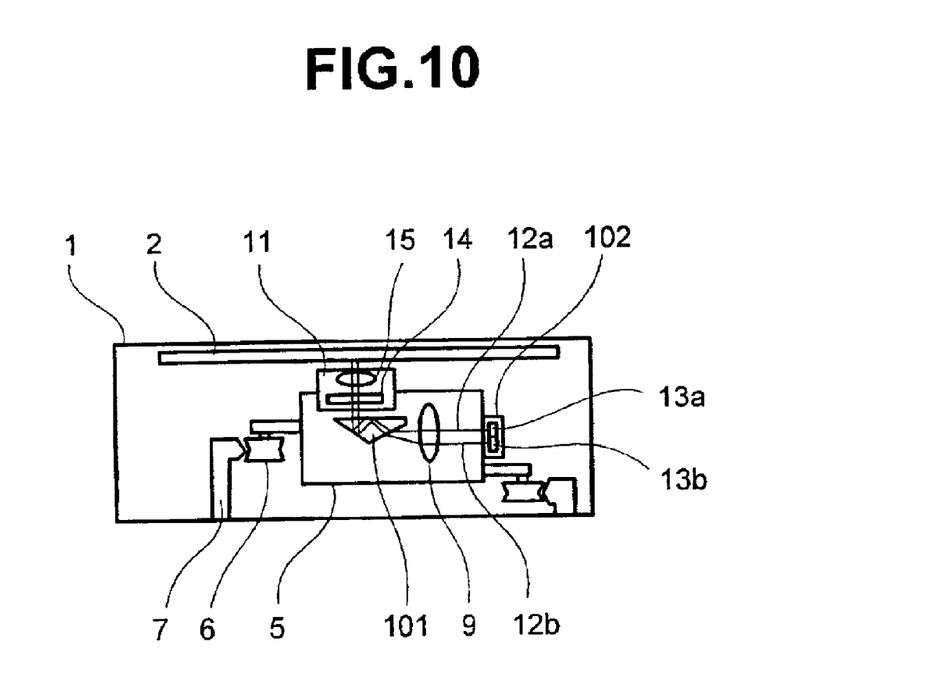
FIG. 10 is a side-view drawing showing another embodiment of an optical disk device according to the present invention.

FIG. 10 shows a side-view of an architecture of another embodiment of an optical disk device according to the present invention. FIG. 10 differs from FIG. 1 in the two-laser module 102 and the beam-shaping upward prism 101.

Unlike the semiconductor laser chip 8 from FIG. 1, the two-laser module 102 is arranged so that the semiconductor laser chip 13a is positioned above and the semiconductor laser chip 13a is positioned below in the figure.

Figure 11:
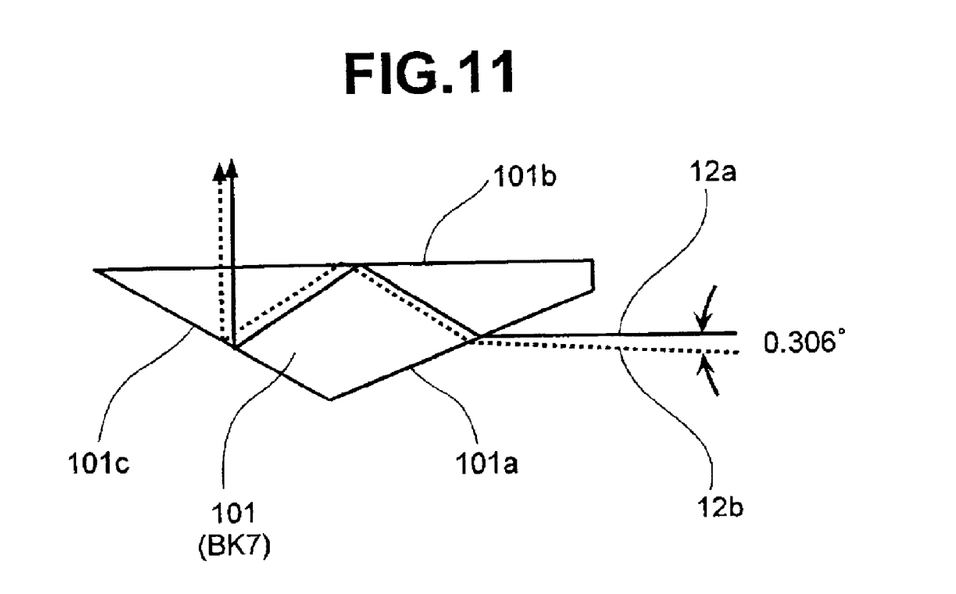
FIG. 11 is a plan drawing showing another beam-shaping upward prism in an optical head according to the present invention.

FIG. 11 shows a plan drawing of the structure of the beam-shaping upward prism 101. The material used in the beam-shaping upward prism 101 is a standard vitreous material referred to as "BK7". The angle formed between a surface 101a and a surface 101b is 29.526 degrees and the angle formed between a surface 101b and a surface 101c is 20.962 degrees. A reflective film is deposited on the surface 101c. The laser beam 12a emitted from the semiconductor laser chip 13a has a wavelength of 660 nm and enters the surface 101a of the beam-shaping upward prism 101 from a horizontal angle and is refracted. The refracted laser beam 12a hits the surface 101b at an entry angle of 59.052 degrees relative to the normal of the surface 101b. The refraction index of the BK7 material at a wavelength of 660 nm is 1.51374 and its critical angle is 41.347 degrees. Since the entry angle of the laser beam 12a is greater than the critical angle, it is reflected by the surface 101b. The laser beam 12a is then reflected by the surface 101c and hits the surface 101b again. However, this time it enters at a perpendicularly so that it passes through the surface 101b and exits the beam-shaping upward prism 101. The beam-shaping upward prism 101 allows the path of the laser beam 12a to be bent at a right angle while also increasing the width of the laser beam by a factor of approximately 2.2. If, with the beam-shaping upward prism 101 shown in FIG. 11, a laser beam with a wavelength of 780 nm is projected at the same horizontal angle as the laser beam 12a, the dispersion of the beam-shaping upward prism 101 will cause the laser beam to be shifted to the left on the figure by 0.14 degrees compared to the exit angle of the laser beam 12a. If a laser beam 12b with a wavelength of 780 nm is projected at an angle shifted upward in the figure by 0.306 degrees from the horizontal angle of the laser beam 12b, as shown in FIG. 11, it can exit the surface 101b perpendicularly as in the laser beam 12a. Thus, as in FIG. 10, the semiconductor laser chips 13a, 13b in the two-laser module 102 should be arranged so that the semiconductor laser chip 13a is positioned upward in the figure and the semiconductor laser chip 13b is positioned downward in the figure.

As described above, the present invention uses the different dispersion characteristics of a beam-shaping prism for different laser beam wavelengths to prevent coma aberrations in the laser spotlights for the laser beam for at least one of the wavelengths.

Also, according to the present invention, in optical heads that record or playback information from or to an optical information medium using multiple laser light sources, an optical head and an optical disk device using the same can be provided that does not require new, expensive optical parts, that tends not to generate aberration in laser beams from semiconductor lasers disposed away from the optical axis, that allows information to be recorded, and that can be formed with a thin design.

According to the present invention, aberration generated by laser beams can be reduced in cases where laser light sources with multiple wavelengths are used.

What is claimed is:

1. An optical head comprising:
    laser light sources emitting a plurality of laser beams with different wavelengths;
    a single means for converting beam width of said plurality of laser beams, said beam width converting means having dispersion characteristics so that said plurality of laser beams emitted from said laser light sources exit at different angles when said plurality of laser beams enter at identical angles; and
    a single means for optically focusing said plurality of laser beams exiting from said beam width converting means to an optical spot on an optical information medium;
    wherein said plurality of laser beams emitted from said laser light sources include laser beams which pass through said width converting means and,
    at least one of said laser beams is offset in angle of entry into said focusing means relative to an exit angle of a second laser beam, and said offset is less than 1.17 degrees.

2. An optical head as described in claim 1 wherein said laser light source is positioned so that said plurality of laser beams emitted from said plurality of laser light sources enters said optical focusing means within an entry angle tolerance range.

3. An optical head as described in claim 1 wherein said beam width converting means is a refracting-type means for converting beam widths through refraction.

4. An optical head comprising:
    laser light sources emitting a plurality of laser beams with different wavelengths;
    a single means for converting beam widths of said plurality of laser beams; and
    a single means for optically focusing said plurality of laser beams exiting from said beam width converting means to an optical spot on an optical information medium;
    wherein:
    said beam width converting means has dispersion characteristics so that said plurality of laser beams emitted from said laser light sources exit at different angles when said plurality of laser beams enter at identical angles;
    said plurality of laser beams emitted from said laser light sources include laser beams which pass through said width converting means and, at least one of said laser beams is offset in angle of entry into said focusing means relative to an exit angle of a second laser beam, said offset is less than 1.17 degrees; and
    said laser light sources are arranged in a sequence determined by wavelength in order to use the dispersion characteristics of said beam width convening means to reduce coma aberrations generated by said plurality of laser beams one of which is an offset in the entry angle to said focusing means.

5. An optical bead as described in claim 4 wherein:
    said beam width converting means is a refracting-type means for converting beam widths through refraction; and
    said laser light sources are arranged so that laser light sources with longer wavelengths are positioned closer to an extension line of a refracted beam created by said refraction of said beam width converting means.

6. An optical head as described in claim 5 wherein said refracting-type beam width converting means comprises a prism.

7. An optical disk device comprising:
    an optical head including: laser light sources emitting a plurality of laser beams with different wavelengths; a single means for converting beam width having dispersion characteristics so that said plurality of laser beams emitted from said laser light sources exit at different angles when said plurality of laser beams enter at identical angles and converting beam widths of said plurality of laser beams; and a single means for optically focusing said plurality of laser beams exiting from said beam width converting means to an optical spot on an optical information medium;
    wherein said plurality of laser beams emitted from said laser light sources include laser beams which go through said width converting means and, at least one of said laser beams is offset in angle of entry into said focusing means relative to an exit angle of a second laser beam said offset is less than 1.17 degrees; and
    wherein:
    a laser beam from said optical head is projected on said optical information medium;
    a laser beam reflected from said optical information medium is projected onto a plurality of optical detector elements; and
    a signal electronically converted by said plurality of optical detector elements is used to provide a control signal and an information playback signal.

* * * * *